Jan. 13, 1931.   W. TOBLER   1,789,089
PISTON FOR SINGLE ACTING ENGINES
Filed June 11, 1929

INVENTOR:
Werner Tobler
BY
Pennie Davis Marvin + Edmonds
ATTORNEY.

Patented Jan. 13, 1931

1,789,089

UNITED STATES PATENT OFFICE

WERNER TOBLER, OF WINTERTHUR, SWITZERLAND, ASSIGNOR TO THE FIRM OF SULZER FRERES SOCIETE ANONYME, OF WINTERTHUR, SWITZERLAND

PISTON FOR SINGLE-ACTING ENGINES

Application filed June 11, 1929, Serial No. 369,953, and in Switzerland July 2, 1928.

This invention relates to pistons for single-acting engines of the kind having a gudgeon pin mounted within the body of the piston and directly engaged by the connecting rod which is not provided with a crosshead. The object of the invention is to provide a piston of this type which can be readily dismantled and in which the gudgeon pin does not in any way interfere with the piston skirt.

According to this invention the gudgeon pin is shorter than the internal diameter of the piston skirt and that surface of the central portion of the pin which lies between the forked arms of the connecting rod and is adjacent to the piston head is detachably secured to the body of the piston. Preferably the surface of the gudgeon pin opposite to the cylinder head is formed as a cylindrical bearing for the connecting rod. In this way not only can the piston be more readily dismantled but the skirt of the piston is entirely free from the gudgeon pin or any action thereof.

The part of the gudgeon pin which is attached to the piston is preferably secured to the piston head by a conical rib or web and in addition approximately parallel reinforcing ribs connecting the gudgeon pin support to the skirt of the piston may be provided. The gudgeon pin is detachably secured by studs or bolts which are accessible after the cylinder head has been removed and the pin preferably fits into a recess in the piston body having flat surfaces which can be machined through the open end of the piston skirt without having to interfere with the wall or cylindrical surfaces of the piston.

Figure 1:
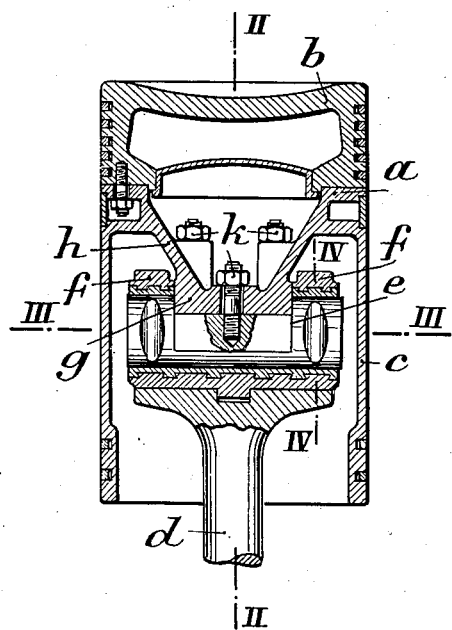
Figure 2:
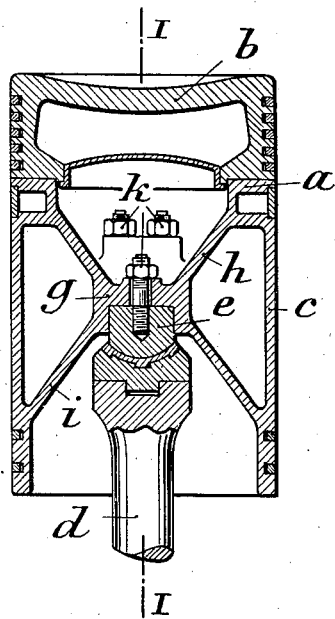
Figure 3:
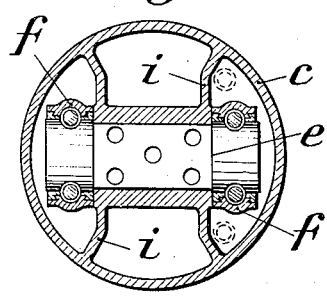
Figure 4:
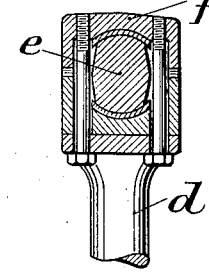

One construction of piston according to this invention is illustrated by way of example in the accompanying drawings, in which Figure 1 is a section on the line I—I of Figure 2, Figure 2 is a section on the line II—II of Figure 1, Figure 3 is a cross-section on the line III—III of Figure 1, and Figure 4 is a vertical section through the upper end of the connecting rod on the line IV—IV of Figure 1.

In the construction illustrated the piston comprises a body portion $a$ having a head $b$ to which the skirt $c$ is detachably secured in the known manner. The connecting rod $d$ directly engages a gudgeon pin $e$ without the use of a crosshead the ends of the pin $e$, which do not engage the skirt in any way, supporting the bearings $f$ formed in the forked end of the connecting rod $d$. That surface of the central portion of the gudgeon pin which lies between the forked arms of the connecting rod and is adjacent to the piston head is detachably secured to the piston and the opposite surface of the central portion of the pin forms a cylindrical bearing for the connecting rod. Thus the forces to be transmitted by the connecting rod to the piston are substantially at right angles to the length of the gudgeon pin and bending stresses are almost entirely avoided. The central portion $g$ of the piston body to which the gudgeon pin is secured is directly supported on the piston head by means of a conical web $h$ and in addition substantially parallel ribs $i$ connect the central portion of the body to the skirt of the piston forming a box-like structure as clearly shown in Figure 3.

The gudgeon pin is detachably connected to the body of the piston by studs $k$ which are accessible from the upper end of the piston after the piston head has been detached. Thus by releasing the studs $k$ the piston can be withdrawn through the upper end of the cylinder without dismantling the connecting rod bearings and similarly the connecting rod can be uncoupled from the piston without removing the latter from its cylinder. The central portion of the gudgeon pin is provided with flat surfaces which fit into a corresponding recess formed in the central portion $g$ of the piston body and these surfaces can be machined or otherwise worked without it being necessary to pierce the skirt or otherwise interfere with the continuity of the cylindrical wall of the piston.

Such a piston is particularly applicable for use with internal combustion engines since, owing to the freedom from any apertures in the skirt, no leakage can take place past the gudgeon pin which prevents any discharge of lubricant into the exhaust such as usually occurs with pistons of known construction.

I claim:

1. A piston having a head and a skirt, a connecting rod therefor, said connecting rod having a forked upper end, a gudgeon pin journaled at each end in said fork, said gudgeon pin having a portion between the journals which is rigidly fixed to the bottom of the piston and a surface bearing on the stay of said fork, whereby said bearing surface as well as the bearing surfaces in the journals takes up the forces on the piston so that the forces on the piston are transmitted to the connecting rod without causing any bending stresses in the gudgeon pin.

2. In a piston for single-acting engines in combination a piston having a head and a skirt, a connecting rod, a forked end provided on said connecting rod, a gudgeon pin engaged in said forked end and of less length than the internal diameter of said piston skirt, means for detachably connecting the central portion of said gudgeon pin to said piston, and a conical web for directly supporting the portion of said piston to which said gudgeon pin is secured.

3. In a piston for single-acting engines in combination a piston having a head and a skirt, a connecting rod, a forked end provided on said connecting rod, a gudgeon pin engaged in said forked end and of less length than the internal diameter of said piston skirt, means for detachably connecting the central portion of said gudgeon pin to said piston, a conical web and additional webs between the housing of said gudgeon pin and said skirt of said piston for directly supporting the portion of said piston to which said gudgeon pin is secured.

4. In a piston for single-acting engines in combination, a piston having a head and a skirt, a connecting rod, a forked end provided on said connecting rod, a gudgeon pin engaged in said forked end and of less length than the internal diameter of said piston skirt and means for detachably connecting the central portion of said gudgeon pin to said piston, said means being accessible from the cover end of said cylinder.

5. In a piston for single-acting engines in combination, a piston having a head and a skirt, a connecting rod, a forked end provided on said connecting rod, a gudgeon pin engaged in said forked end and of less length than the internal diameter of said piston skirt, means for detachably connecting the central portion of said gudgeon pin to said piston, said means being accessible from the cover end of said cylinder, said gudgeon pin being provided with a surface opposite to said piston head formed as a cylindrical bearing for said connecting rod and engaging a recess in said piston with flat surfaces which may be mechanically treated from the end of said piston without necessitating any piercing of said piston skirt.

In testimony whereof I have affixed my signature.

WERNER TOBLER.